US010457066B2

(12) United States Patent
Perdicaro et al.

(10) Patent No.: US 10,457,066 B2
(45) Date of Patent: Oct. 29, 2019

(54) IMAGE TRANSFORMATIONS BASED ON DEFECTS

(71) Applicant: Hewlett-Packard Development Company, L.P., Houston, TX (US)

(72) Inventors: Frank E. Perdicaro, Corvallis, OR (US); Jose Galmes, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/760,314

(22) PCT Filed: Nov. 30, 2015

(86) PCT No.: PCT/US2015/062908
§ 371 (c)(1),
(2) Date: Mar. 15, 2018

(87) PCT Pub. No.: WO2017/095360
PCT Pub. Date: Jun. 8, 2017

(65) Prior Publication Data
US 2018/0257392 A1 Sep. 13, 2018

(51) Int. Cl.
| | |
|---|---|
| *B41J 2/21* | (2006.01) |
| *G06T 3/00* | (2006.01) |
| *G06T 3/60* | (2006.01) |
| *B41J 29/393* | (2006.01) |
| *H04N 1/00* | (2006.01) |

(52) U.S. Cl.
CPC .......... *B41J 2/2139* (2013.01); *B41J 2/2142* (2013.01); *B41J 2/2146* (2013.01); *B41J 29/393* (2013.01); *G06T 3/0006* (2013.01); *G06T 3/60* (2013.01); *H04N 1/00037* (2013.01); *H04N 1/00045* (2013.01)

(58) Field of Classification Search
CPC ........................................................ B41J 2/2139
See application file for complete search history.

(56) References Cited

U.S. PATENT DOCUMENTS

| | | | |
|---|---|---|---|
| 6,637,853 B1 | 10/2003 | Ahne et al. | |
| 7,287,824 B2 | 10/2007 | Subirada et al. | |
| 7,866,788 B2 | 1/2011 | Jorba et al. | |
| 7,980,647 B2 | 7/2011 | Walmsley et al. | |
| | | (Continued) | |

FOREIGN PATENT DOCUMENTS

WO   WO-2017019040   2/2017

OTHER PUBLICATIONS

Vantram, S.R. et al., Fully Automated Calibration Procedure to Compensate Print Non-uniformities Incurred in Fixed Print-head Array Structures, Jan. 2014.

*Primary Examiner* — Shelby L Fidler
(74) *Attorney, Agent, or Firm* — HP Inc. Patent Department (57) ABSTRACT

An example system includes a print engine to print a first image on a medium. The system also includes a controller communicatively coupled with the print engine. The controller is to detect a failure in the print engine that results in a defect in the first image. The controller also is to perform an affine transformation on a second image to produce a transformed second image. The controller is to instruct the print engine to print the transformed second image.

15 Claims, 6 Drawing Sheets

(56) References Cited

U.S. PATENT DOCUMENTS

| | | | |
|---|---|---|---|
| 2004/0263545 A1* | 12/2004 | Esaki | B41J 3/4071 347/5 |
| 2005/0052483 A1* | 3/2005 | Esaki | B41J 3/4071 347/12 |
| 2009/0088889 A1 | 4/2009 | Hellstrom et al. | |
| 2010/0014109 A1* | 1/2010 | Debaere | B41J 3/4075 358/1.13 |
| 2011/0149331 A1 | 6/2011 | Duggan et al. | |
| 2011/0242173 A1* | 10/2011 | Zama | B41J 2/2142 347/13 |
| 2012/0257917 A1 | 10/2012 | Bockus et al. | |
| 2013/0029825 A1* | 1/2013 | Rich | B41J 3/543 493/324 |
| 2013/0135351 A1* | 5/2013 | Tripathi | G06T 3/606 345/649 |
| 2013/0187973 A1* | 7/2013 | De Smet | B41J 2/2052 347/14 |
| 2014/0184718 A1* | 7/2014 | Cupit | B41J 2/2139 347/211 |
| 2015/0138268 A1 | 5/2015 | Chen et al. | |
| 2015/0298153 A1 | 10/2015 | Baker et al. | |
| 2015/0336381 A1* | 11/2015 | Kyoso | B41J 2/0451 347/14 |
| 2016/0004943 A1* | 1/2016 | Asai | G06K 15/408 358/1.15 |
| 2016/0347085 A1* | 12/2016 | Cloots | B44C 5/04 |

\* cited by examiner

IMAGE TRANSFORMATIONS BASED ON DEFECTS

BACKGROUND

A two-dimensional or three-dimensional printer, such as a web press, may deposit marking or other agents onto a medium (e.g., a web, print bed, etc.), such as paper, cardboard, a print bed, or the like. The medium may be significantly longer and wider than the images to be printed, and the medium may later be cut to form individual units with the images printed on them. The medium may be cut after image formation to create individual sheets, boxes, etc. The printer may allow large numbers of units to be printed quickly.

DETAILED DESCRIPTION

In one example, a web press may include cylinders to form the images on the medium. Alternatively, the web press may include inkjet printheads to form the images on the medium. To save costs, a web press operator may try to waste as little of the medium as possible. The web press operator may arrange as many images as possible across the web to minimize the unused medium. As used herein, the term "across" web refers to the direction perpendicular (on the surface of the web) to the direction the web moves through the web press. The web press operator may efficiently minimize the unused medium by printing a plurality of images having different widths (e.g., by stacking the images across the web). As used herein, the term image "width" refers to the dimension of the image parallel to the direction across the web. The web press operator can vary the number of each type of image until the unused medium is minimized. The images may be repeated along the web. As used herein, the term "along" the web refers to the direction perpendicular to the across web direction. As used herein, a "ribbon" is an elongated strip on a medium to receive a set of images repeated end-to-end along the elongated dimension. For example, a ribbon may be a portion of a web to receive a set of images repeated lengthwise along the web. Each ribbon has a width of one image, but may vary in size depending on the size of the image.

In an example, the web press may include a plurality of printheads at fixed locations across the web. Each location across the web may include printheads for a plurality of colors. For wide webs, the web press may include a large number of total printheads. Although the probability of an individual printhead failing may be small, the aggregate probability of any of the printheads failing is much larger. A failure of a single printhead or nozzle of a printhead may cause defects in the images being printed. Accordingly, even if the individual printheads are very reliable, the reliability of the entire web press may be less than that of the individual printheads. The reliability of the web press could be increased by mitigating printing errors while the web press is printing.

The failure of a printhead may cause defects in the images being printed on a ribbon corresponding to the location of the printhead that failed. However, the images on the remaining ribbons may not have defects. Repairing or replacing the printhead may necessitate stopping the web press. Because of the fast print speed and large number of ribbons of the web press, a significant loss of productivity is experienced from stopping the web press due to a defect in a single ribbon. The maintenance cost of performing a single repair is also higher than if service actions can be grouped so the cost of stopping the press can be spread across multiple maintenance operations. Alternatively, the web press may continue printing, and the ribbon may be discarded. However, discarding the ribbon may result in wasting a significant portion of the medium and wasting printing fluid. In addition, the discarded content may need to be reprinted. A printing company relying on just-in-time delivery of the medium may not have additional medium for reprinting the discarded content. Accordingly, the consequences of a single failed printhead can be significant. Reliability of the web press would be improved by mitigating the defect resulting from the failure of the printhead without stopping the web press. Moreover, service costs would be reduced and productivity increased by stopping the web press less often.

Figure 1:
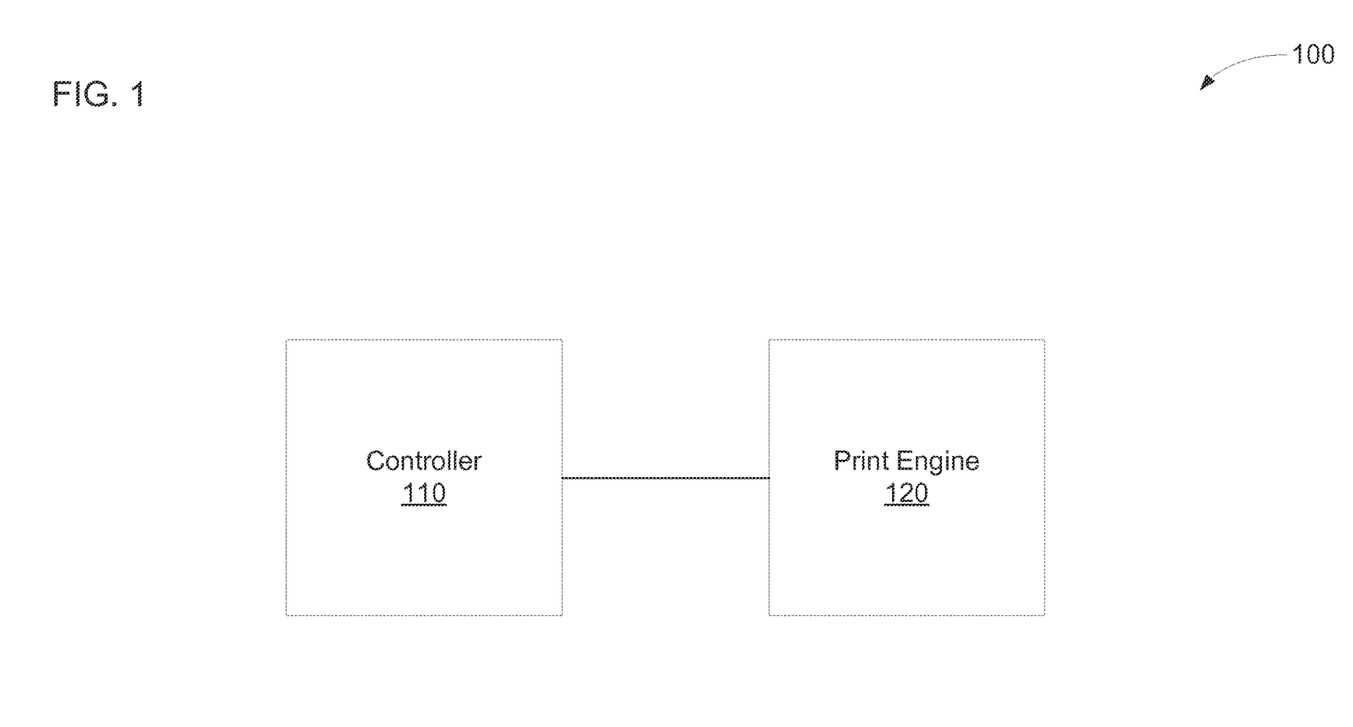
FIG. 1 is a block diagram of an example system to mitigate a defect resulting from the failure of a printhead.

FIG. 1 is a block diagram of an example system 100 to mitigate a defect resulting from the failure of a printhead. The system 100 may include a print engine 120 to print a first image on a medium and a controller 110 communicatively coupled with the print engine 120. The controller 110 may be communicatively coupled directly or indirectly with the print engine 120. For example, the controller 110 and print engine 120 may be included in a pipeline with additional components between the controller 110 and the print engine 120. As used herein, the terms "controller" and "engine" refer to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware. The print engine 120 may include hardware or software and may include printheads, cylinders, or the like to form the first image on the medium. In one example, the print engine 120 may include inkjet printheads. In an example, the medium may be a web, and the first image may be printed on a ribbon of the web. The medium may include, for example, paper, cardboard, a print bed, or the like.

The controller 110 may detect a failure, such as a failure in the print engine 120, that results in a defect in the first image. The controller 110 may detect the failure directly or indirectly. For example, the controller 110 may detect the failure directly by receiving an indication of the failure or a fault from the print engine 120. The controller 110 may determine whether the failure or fault will cause a defect in the first image. In an example, the controller 110 may detect the failure indirectly by analyzing the first image and detecting the defect in the first image. The controller 110 may determine where the failure occurred based on the location of the defect in the first image.

The controller 110 may perform an affine transformation on a second image to produce a transformed second image. The second image may be identical to the first image, different from the first image, share some similarities with the first image, or the like. The second image may be an image that is to be printed on a same ribbon as the first image. The affine transformation may be selected to prevent or mitigate a defect that might appear in the second image due to the failure. For example, the affine transformation may move features in the second image from locations where they would be affected by the failure to locations where they would not.

The controller 110 may instruct the print engine 120 to print the transformed second image. The print engine 120 may print the transformed second image, for example, on the same ribbon on which the first image was printed. Due to the affine transformation, the second image may be printed without a defect or with a less significant defect than had the second image been printed without the affine transformation. Accordingly, the system 100 is able to continue printing without wasting additional medium and without stopping for repair.

Figure 2:
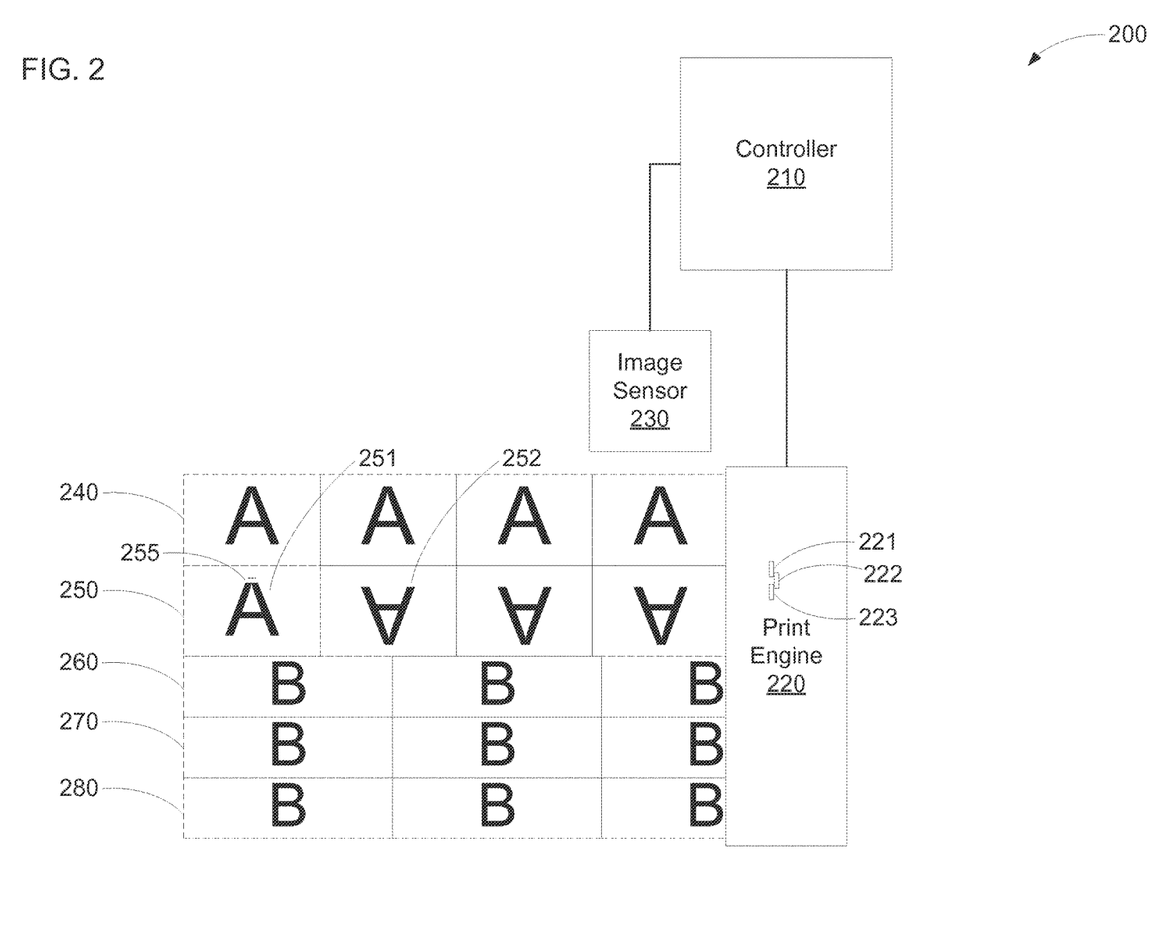
FIG. 2 is a block diagram of another example system to mitigate a defect resulting from the failure of a printhead.

FIG. 2 is a block diagram of another example system 200 to mitigate a defect resulting from the failure of a printhead 222. The system 200 may include a print engine 220 to print a first image 251 on a medium. The print engine 220 may include a plurality of printheads 221-223 to print the first image 251 on the medium. In an example, the printheads 221-223 may be stationary and may not reciprocate. The illustrated example includes three printheads, but other examples may include tens, hundreds, thousands, or more printheads. In the illustrated example, the medium may include a first ribbon 240, a second ribbon 250, a third ribbon 260, a fourth ribbon 270, and a fifth ribbon 280. The print engine 220 may print the first image on the second ribbon 250. The first ribbon 240 may include images identical to the first image 251 while the third, fourth, and fifth ribbons 260-280 may include different images.

The system 200 may include an image sensor 230 to capture an image of the printed first image 251. The system 200 may also include a controller 210 communicatively coupled with the print engine 220 and the image sensor 230. The controller 210 may analyze the captured image of the printed first image 251 to determine whether there are any defects present in the printed first image 251. For example, the controller 210 may detect a defect 255 in the printed first image 251. The controller 210 may compare the printed first image 251 with original print data to detect the defect 255. The controller 210 may determine based on the defect 255 that a failure has occurred in the print engine 220. The failure may prevent the print engine 220 from printing a color at a particular location on the ribbon 250. In an example, the location may be a scanline. As used herein, the term "scanline" refers a line of pixels parallel to the direction the medium moves through the system 200. The controller 210 may determine which scanline contains the defect.

The controller 210 may determine based on the location or the color of the defect 255 that the failure has occurred in the second printhead 222. For example, the controller 210 may maintain a map from pixels (or scanlines) to the printheads 221-223 responsible for printing those pixels (or scanlines). In an example, the controller 210 may generate the map at the beginning of a print job based on which printheads 221-223 will be printing each portion of the print job. The controller 210 may also generate a map from each ribbon 240-280 to the printheads printing pixels in that ribbon. The controller 210 may use the map to determine the failed printhead 222 based on the location and the color of the defect 255. Alternatively, or in addition, the controller 210 may determine the location or color of the defect without determining which specific printhead 221-223 failed.

The controller 210 may determine whether the defect can be remedied or mitigated by performing an affine transformation on a second image 252 to be printed. In the illustrated example, the second image 252 is the same as the first image 251. In other examples, the second image 252 may be entirely different from the first image 251 or may be similar with minor variations or customizations. In an example, the controller 210 may determine whether the defect can be remedied or mitigated by performing an affine transformation selected from the group consisting of scaling, translation, rotation, reflection, and a combination of such transformations or an affine transformation selected from a subset of that group.

There may be predetermined (e.g., user specified, manufacturer specified, etc.) limits on the parameters of the affine transformations or predetermined limits on which affine transformations can be performed. For example, rotation of the second image 252 may be restricted to certain angles (e.g., angles divisible by 90 degrees, angles divisible by 180 degrees, etc.). Scaling may be restricted to predetermined percentages of the original size, such as 1%, 2%, 5%, 10%, etc. larger or smaller than the original size. Translation may be restricted in distance or direction, and the distance may be specified in units of length, as a percentage of the image size, as a percentage of the ribbon size, or the like. The controller 210 may determine whether an affine transformation within the predetermined limits can prevent or mitigate the defect 255 in the second image 252.

In an example, the controller 210 may initially determine whether the affine transformation will change which portion of the second image 252 is affected by the defect. For example, a defect in the center of the second image 252 may not be affected by a rotation or reflection. If the affine transformation changes which portion of the second image 252 is affected by the defect, the controller 210 may determine whether the defect is mitigated or made worse by the affine transformation. Alternatively, or in addition, the controller 210 may analyze the effects of the affine transformation without initially determining whether it will change which portion of the second image 252 is affected by the defect.

In an example, the controller 210 may simulate printing the second image 252 with the affine transformation applied to it to determine whether the defect is remedied or mitigated. The controller 210 may run the transformed image by a virtual array of fixed printheads and determine how much of the transformed image is printed by the failed printhead. Alternatively, or in addition, the controller 210 may determine how much of the print content in the transformed image corresponds to the color and location of the defect or the failed printhead. The controller 210 may generate a histogram indicating the amount of print content in each scanline corresponding to a particular color (e.g., the number of pixels in each scanline containing the particular color). The controller 210 may determine which entry in the histogram will correspond to the failed printhead after transformation. The controller 210 may determine from that entry how much print content the failed printhead would be responsible for printing. If multiple entries correspond to the failed printhead, they may be summed to determine how much print content the failed printhead would be responsible for printing. The controller 210 may compare how much print content is printed by the failed printhead in the transformed image versus how much is printed by the failed printhead in the original image. The controller 210 may generate the histogram when the defect is detected or at the beginning of the print job. In an example, the controller 210 may determine a scanline in the second image 252 containing little or no print content that is the same color as the defect. The controller 210 may determine whether an affine transformation within the predetermined limits can align the determined scanline with the defect area.

The controller 210 may decide whether the affine transformation should be performed on the second image 252 based on the determination of whether the defect can be remedied or mitigated or based on how much the defect can be remedied or mitigated. In the illustrated example, a 180-degree rotation may completely remedy the defect, so the second image 252 may be printed with the 180-degree rotation. In the illustrated example, the 180-degree rotation is also equivalent to a reflection. Various thresholds may be used to decide whether the affine transformation should be performed. In an example, the controller 210 may decide to perform the affine transformation if the defect affects less print content in the transformed image than in the original image (e.g., fewer pixels have a location and color corresponding to the defect). Alternatively, or in addition, the controller 210 may perform the affine transformation if the transformed image is within a predetermined threshold of the second image 252 without defects (e.g., fewer than a threshold number of pixels have a location and color corresponding to the defect). For example, the controller 210 may decide to stop the system 200 for repair of the printhead 222 if the affine transformation cannot bring the transformed image within the predetermined threshold of the second image 252 without defects. In an example, the controller 210 may prompt a user to decide whether the affine transformation should be performed rather than deciding automatically.

The controller 210 may perform the affine transformation on the second image 252. In an example, the controller 210 may perform the affine transformation on a compressed representation of the second image 252. For example, the controller 210 may substitute compressed blocks in the compressed representation with compressed blocks corresponding to transformed variants of the compressed blocks. A run of identical blocks may be indicated in the compressed representation by a compressed block and an indication to repeat that block an indicated number of times. The compressed block may be replaced by the transformed variant and the indication to repeat the block may be unchanged. Alternatively, or in addition, the indication to repeat may be replaced by the indicated number of copies of the compressed block. The controller 210 may also, or instead, rearrange the transformed variants. The substituted or rearranged blocks may be provided to the print engine 220 to print the transformed second image.

In an example, the controller 210 may perform a 180-degree rotation. The controller 210 may include a lookup table for substituting compressed blocks with 180-degree rotational variants of the compressed blocks. The 180-degree rotational variants may be precomputed for all possible compressed blocks and stored in the lookup table. Accordingly, the controller 210 may rapidly transform the compressed blocks without uncompressing the blocks by substituting each block with the 180-degree rotational variant found in the lookup table. In an example, the controller 210 may rearrange the rotational variants by outputting the rotational variants in a reverse order rather than rearranging the rotational variants in place. When outputting the rotational variants in a reverse order, an indication to repeat a block may be rearranged to follow the block to which it refers. The controller 210 may output the 180-degree rotational variants without initially performing a substitution in place in some examples. Rather, the controller 210 may substitute the rotational variants as it outputs them. The controller 210 may precompute pixel-to-printhead mappings, transformed variants, or the like before beginning the print job so the system 200 can begin printing the transformed second image 252 immediately after the controller 210 detects the defect.

The print engine 220 may print the transformed second image 252 on the second ribbon. In an example, the print engine 220 may print the transformed second image 252 without printing transformed copies of the second image 252 on the first ribbon 240 and without printing transformations of other images on the third, fourth, and fifth ribbons 260-280. Alternatively, or in addition, the controller 210 may transform images on a plurality of ribbons 240-280 individually or as a group, and the print engine 220 may print the resulting transformed images. The controller 210 and the print engine 220 may continue to print copies of the transformed second image 252 on the second ribbon 250 until instructed otherwise, until the failure is remedied, for a predetermined length of time, or the like. If additional printhead failures occur, the controller 210 may perform additional transformations on the second ribbon 250, other ribbons 240, 260-280 individually, or a plurality of the ribbons 240-280.

The affine transformation of the second image 252 may result in additional post-processing being needed. For example, the web may need to be cut in alternate locations, or the cut images may need to be stacked in an alternate orientation (e.g., a rotated orientation). The controller 210 may determine where printing of the transformed second image 252 began and which ribbon includes the transformed second image 252. Alternatively, or in addition, the controller 210 may determine new cut lines. The controller 210 may indicate information about the transformation to other systems operating on the web, such as by indicating where printing of the transformed second image 252 began, which ribbon includes the transformed second image 252, where the new cut lines are located, or the like. For example, the controller 210 may store the information in a job description format. Alternatively, or in addition, the controller 210 may indicate the information directly to the user. The controller 210 may also, or instead, notify the user or a log that an error or exception has occurred while continuing to print.

Figure 3:
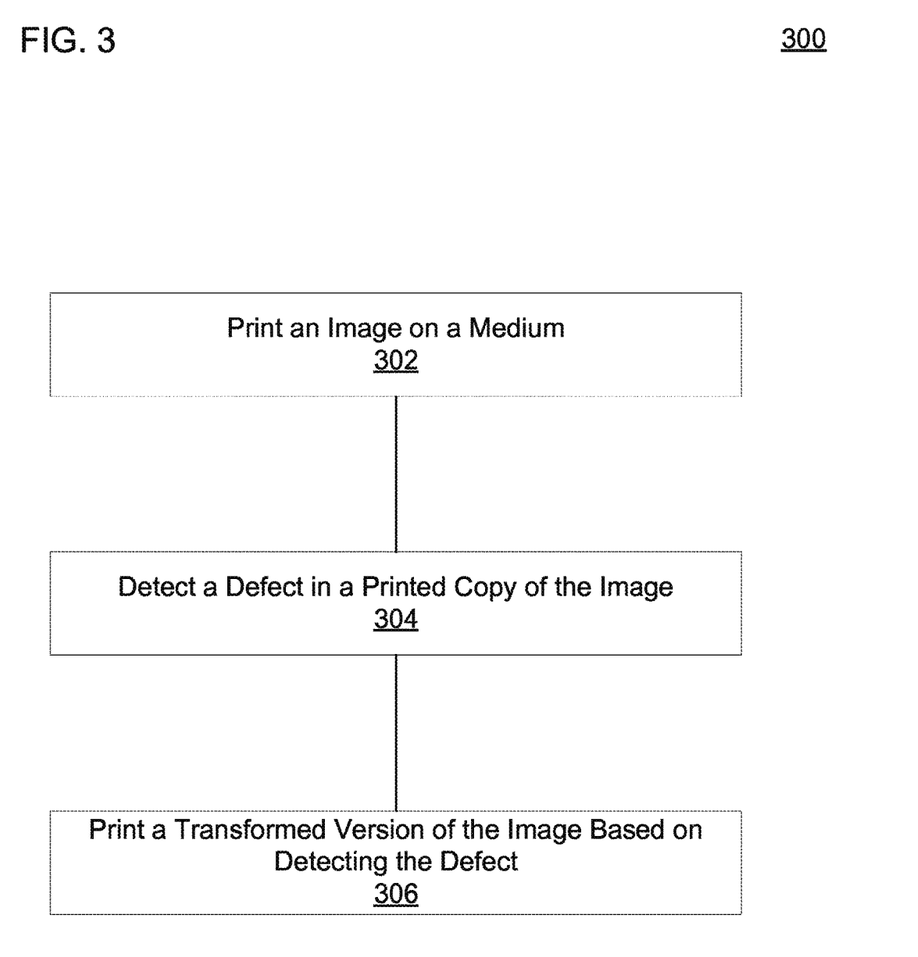
FIG. 3 is a flow diagram of an example method to mitigate a defect in a printed copy of an image.

FIG. 3 is a flow diagram of an example method 300 to mitigate a defect in a printed copy of an image. A processor or a print engine may perform the method 300. At block 302, the method 300 may include printing an image on a medium. For example, the image may be printed on a ribbon of a web. Alternatively, or in addition, the medium may be a loose sheet, a print bed for receiving a three-dimensionally (3D) printed objected, or the like.

Block 304 may include detecting a defect in a printed copy of the image. The defect may be detected directly, for example, by capturing an image of the printed copy of the image and analyzing the captured image. In an example, the defect may be detected by detecting a particular color of printing fluid or a particular material is missing from a location in the printed copy of the image where an electronic version of the image indicates the particular color of printing fluid or particular material should be. Alternatively, or in addition, the defect may be detected indirectly by detecting a failure of a component to form the image, such as a failure of a printhead. In some examples, the location of the defect may be detected in addition to the existence of the defect.

At block 306, the method 300 may include printing a transformed version of the image based on detecting the defect. The transformation may include an affine transformation (e.g., scaling, translation, rotation, reflection, a combination of such transformations, etc.), a transformation from color to monochrome or vice versa, or the like. Transforming the image may prevent the defect from being formed in the transformed version of the image. For example, the defect may be caused by a failure of a printhead. Transforming the image may allow the image to be printed without use of the failed printhead. Alternatively, transforming the image may reduce but not entirely eliminate use of the failed printhead. Thus, the transformed version of the image can be printed without performing repairs to correct the defect. Referring to FIG. 1, for example, blocks 302 and 306 may be performed by the print engine 120 or the controller 110, and block 304 may be performed by the controller 110.

Figure 4:
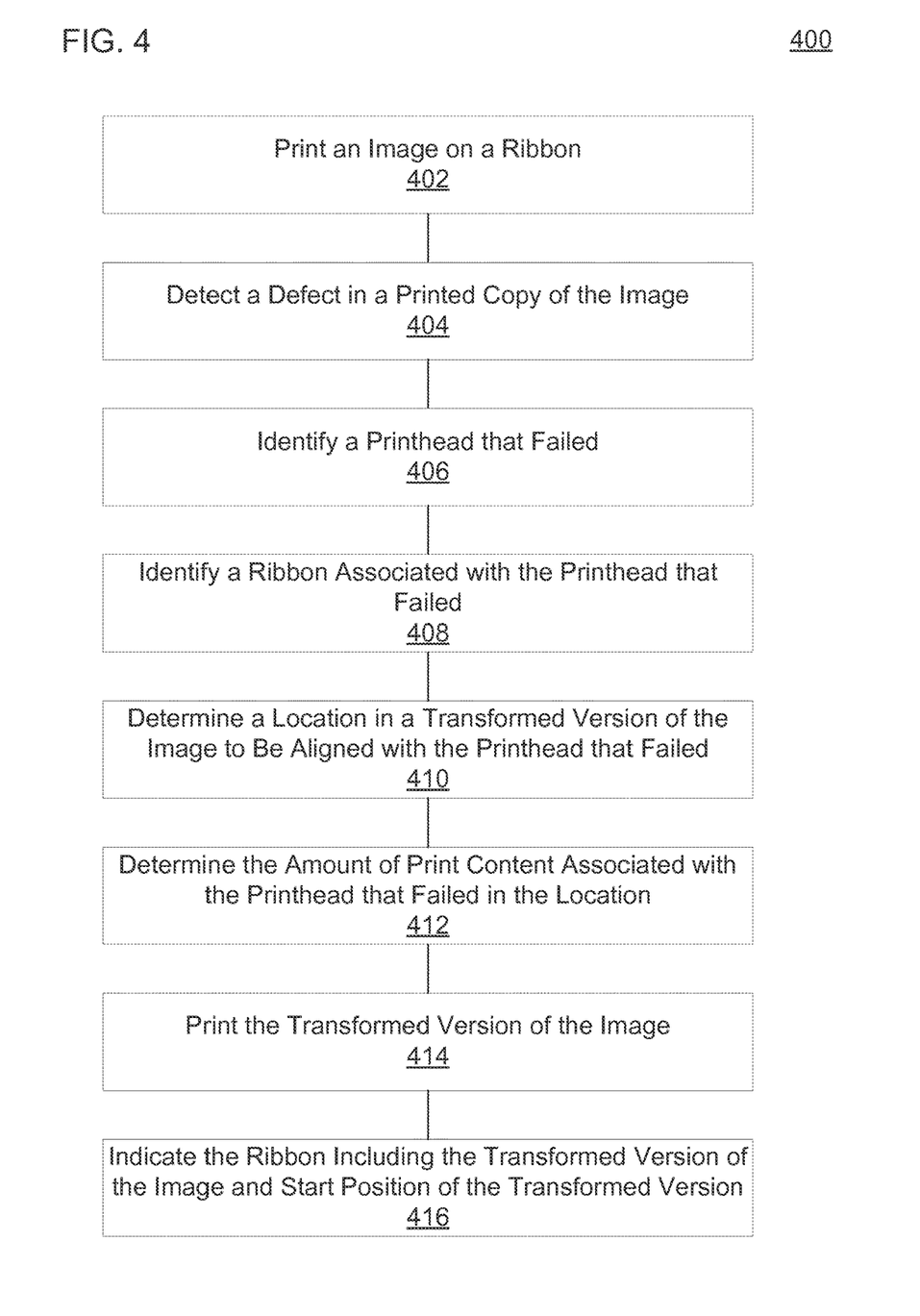
FIG. 4 is a flow diagram of another example method to mitigate a defect in a printed copy of an image.

FIG. 4 is a flow diagram of an example method 400 to mitigate a defect in a printed copy of an image. A processor or a print engine may perform the method 400. Block 402 may include printing an image on a ribbon. The ribbon may be one of a plurality of ribbons on a medium. Other images may be printed on the other ribbons. The other images may be identical to, entirely different from, or similar with some differences from the image printed on the ribbon. Block 404 may include detecting a defect in the printed copy of the image. For example, the defect may be detected by capturing an image of the printed copy of the image. The captured image may be analyzed to determine whether a particular color of printing fluid or a particular material is missing from the printed copy. Detecting the defect may include identifying a location of the defect.

Block 406 may include identifying a printhead that failed. In an example, the printhead that failed may be identified based on the location of the defect. For example, the printhead may be identified based on a mapping between locations on the medium and printheads. At block 408, the method 400 may include identifying a ribbon associated with the printhead that failed. The ribbon may be identified based on the location of the defect, based on the printhead that failed, or the like. For example, the ribbon may be identified based on a mapping between ribbons and printheads or locations on the medium.

Block 410 may include determining a location in a transformed version of the image to be aligned with the printhead that failed. The location may be determined by computing a transformed version of the image, by applying an inverse of the transformation to a location aligned with the failed printhead during printing of the original image, or the like. At block 412, the method 400 may include determining the amount of print content in the determined location that is associated with the printhead that failed. For example, the amount of print content may be determined from a histogram indicating how many pixels at the determined location contain a color associated with the printhead that failed, by summing the number of pixels at the determined location containing a color associated with the printhead that failed, by virtually simulating printing to determine how much print content the failed printhead is responsible for printing, or the like.

Block 412 may also include determining whether the amount of print content associated with the printhead that failed is less than a threshold. The threshold may be the amount of print content in the original image associated with the printhead that failed, an absolute number of pixels, a percentage of pixels, or the like. At block 414, the method 400 may include printing the transformed version of the image. The transformed version of the image may be printed based on the amount of print content associated with the printhead that failed being less than the threshold. The transformed version of the image may be printed on the same ribbon on which the original image was printed. In an example, the transformed version of the image may be a 180-degree rotated version of the image, which may be simple to accommodate during downstream processing.

At block 416, the method 400 may include indicating the ribbon that includes the transformed version of the image and indicating a start position of the transformed version of the image. The portion of the ribbon with the transformed version of the image may need different downstream processing than the portion of the ribbon with the original version of the image or other ribbons without transformed images. The ribbon and start position may be indicted to downstream devices so the downstream devices process the ribbon correctly. The ribbon and start position may be indicated as an absolute distance, by a numerical indication of an individual unit in the medium, as a percentage of the entire length or width, by a combination of such indications, or the like. Indicating the ribbon and start position may include issuing to a user an error or exception that indicates the ribbon and start position, logging an indication that a transformed version of the image is to be printed with the ribbon and start position included, or the like. In an example, the controller 210 of FIG. 2 may perform blocks 402-416, or the print engine 220 may perform blocks 402 and 414.

Figure 5:
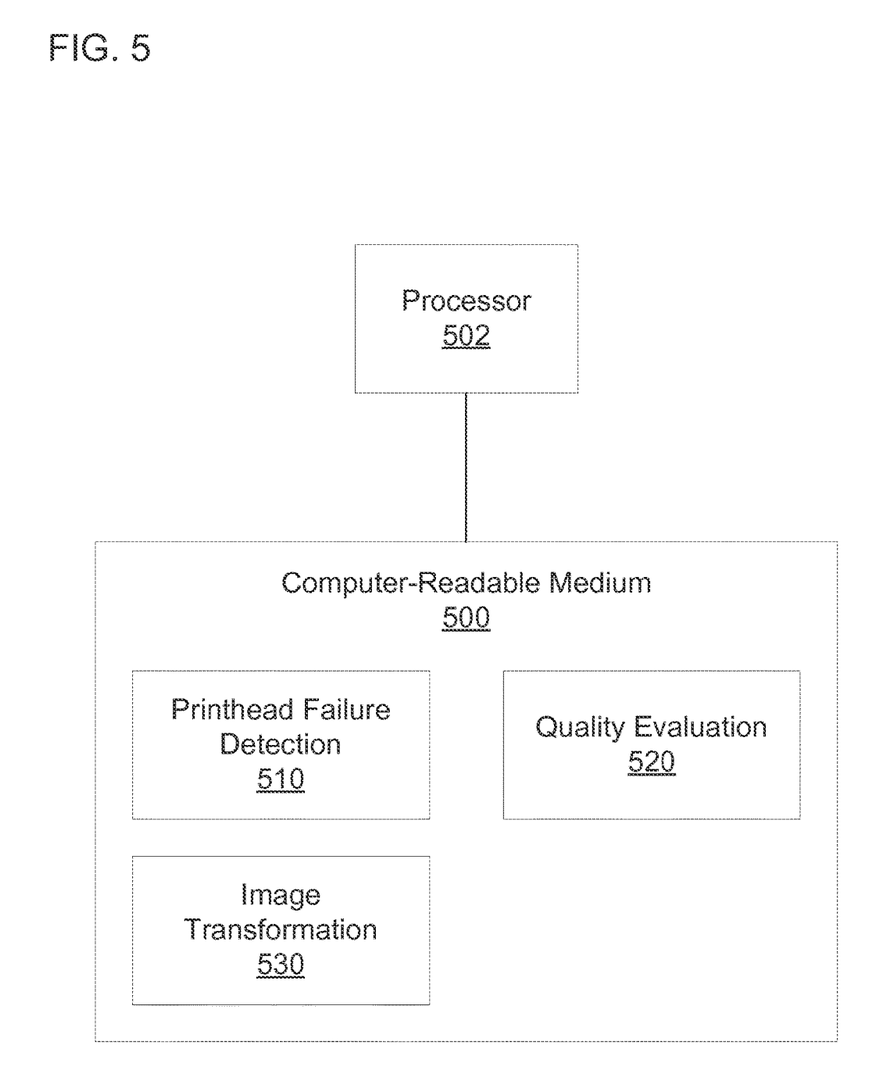
FIG. 5 is a block diagram of an example computer-readable medium including instructions that cause a processor to mitigate a failure of a printhead.

FIG. 5 is a block diagram of an example computer-readable medium 500 containing instructions that, when executed by a processor 502, cause the processor 502 to mitigate a failure of a printhead. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a printhead failure detection module 510. As used herein, a "module" (in some examples referred to as a "software module") is a set of instructions that when executed or interpreted by a processor or stored at a processor-readable medium realizes a component or performs a method. The printhead failure detection module 510 may include instructions that cause the processor 502 to detect a failure of a printhead. In an example, the printhead failure detection module 510 may cause the processor 502 to receive an indication of the failure directly from the printhead. Alternatively, or in addition, the printhead failure detection module 510 may cause the processor 502 to compare a captured image of a printed product to a stored image to determine whether any defects are present.

The computer-readable medium 500 may also include a quality evaluation module 520 to cause the processor 502 to determine whether a print quality can be improved by performing an affine transformation on an image to be printed. The affine transformation may be a rotation, a reflection, a translation, a scaling, a combination of such transformations, or the like. The quality evaluation module 520 may cause the processor 502 to determine whether the print quality of the transformed image will be better than that of the original image. In an example, the quality evaluation module 520 may cause the processor 502 to determine whether the failure of the printhead would have a larger effect on the original image or on the transformed image. The quality evaluation module 520 may cause the processor 502 to determine how much printing is to be performed by the printhead with the failure in each image, whether failure of the printhead would affect particular content (e.g., words, logos, pictorial content, etc.) in each image, or the like when determining whether print quality can be improved.

An image transformation module 530 may cause the processor 502 to perform the affine transformation on the image based on a determination the print quality can be improved. In an example, the image transformation module 530 may cause the processor 502 to perform the affine transformation by manipulating pixels in a bitmap representation of the image. Alternatively, or in addition, the image transformation module 530 may cause the processor 502 to perform the affine transformation by operating on a compressed representation of the image. The image transformation module 530 may cause the processor 502 to substitute or rearrange blocks in the compressed representation to perform the affine transformation. The blocks may be substituted or rearranged in place or may be substituted or rearranged as they are output for printing. In an example, the printhead failure detection module 510, the quality evaluation module 520, or the image transformation module 530, when executed by the processor 502, may realize the controller 110 of FIG. 1.

Figure 6:
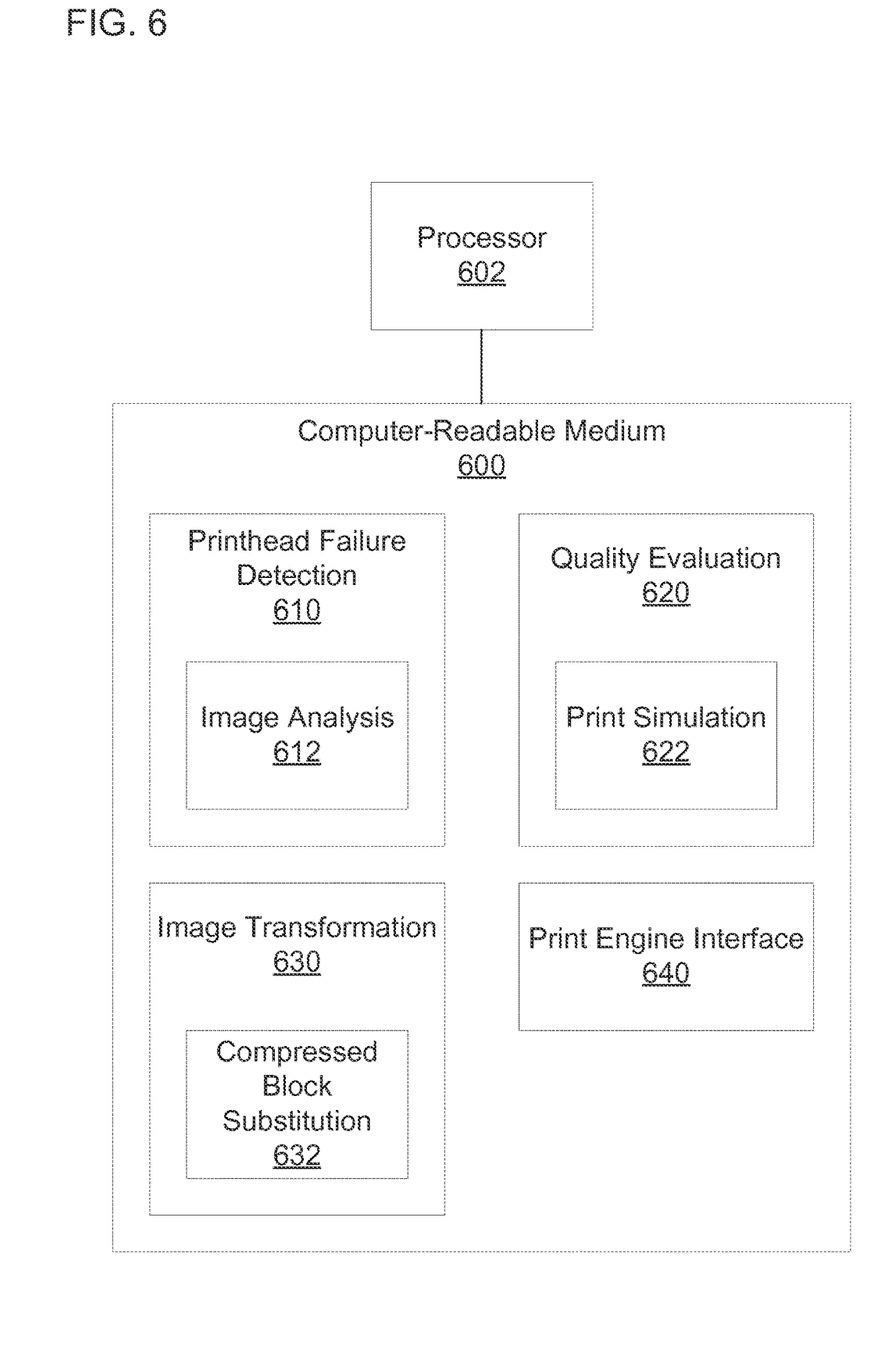
FIG. 6 is a block diagram of another example computer-readable medium including instructions that cause a processor to mitigate a failure of a printhead.

FIG. 6 is a block diagram of another example computer-readable medium 600 containing instructions that, when executed by a processor 602, cause the processor 602 to mitigate a failure of a printhead. The computer-readable medium 600 may include a printhead failure detection module 610 to cause the processor 602 to detect a failure of a printhead. In the illustrated example, the printhead failure detection module 610 includes an image analysis module 612. The image analysis module 612 may cause the processor 602 to analyze a captured image of a printed product (e.g., a printed image) to detect the failure of the printhead. For example, the image analysis module 612 may cause the processor 602 to compare the captured image to a stored image to determine whether there are systematic differences between the images consistent with a failure of a printhead.

The image analysis module 612 may also cause the processor 602 to analyze the captured image to identify the printhead with the failure. In an example, the image analysis module 612 may cause the processor 602 to generate a map between locations in the printed product and the printheads that generated the printed product at those locations. The image analysis module 612 may cause the processor 602 to generate the map at the beginning of a print job based on a stored image to be printed, a layout of ribbons in the print job, or the like. The image analysis module 612 may cause the processor 602 to determine the location of the defect in the captured image and determine the printhead with the failure based on the location and the map.

A quality evaluation module 620 may cause the processor 602 to determine whether the print quality can be improved by performing an affine transformation on an image to be printed. In the illustrated example, the quality evaluation module 620 may include a print simulation module 622. The print simulation module 622 may cause the processor 602 to simulate printing with the affine transformation performed to determine whether the print quality can be improved. In an example, the print simulation module 622 may cause the processor 602 to perform the affine transformation on the image and determine how much print content in the transformed image is formed by the printhead with the failure. The image may be compressed, so the print simulation module 622 may cause the processor 602 to decompress the portion of the image that will be aligned with the failed printhead and determine how much of the print content in the decompressed portion is to be printed by the printhead with the failure.

The quality evaluation module 620 may cause the processor 602 to determine whether the print quality of the transformed image will be improved over the print quality of printing the untransformed image. Alternatively, or in addition, the quality evaluation module 620 may cause the processor 602 to determine whether the print quality can be improved to within a predetermined threshold of the image without defects. For example, the quality evaluation module 620 may cause the processor 602 to compare the print content in the transformed image to be printed by the printhead with the failure as determined by the print simulation module 622 to the predetermined threshold. The print quality may be considered improved within the predetermined threshold of the image without defects if the amount of print content to be printed by the printhead is less than or less than or equal to the predetermined threshold. Alternatively, or in addition, the quality evaluation module 620 may cause the processor 602 to analyze the type of print content to be printed by the printhead with the failure when determining whether the print quality will be improved.

An image transformation module 630 may cause the processor 602 to perform the affine transformation on the image based on a determination the print quality can be improved. In the illustrated example, the image transformation module 630 may include a compressed block substitution module 632. The compressed block substitution module 632 may cause the processor 602 to perform the affine transformation by substituting compressed blocks in a compressed representation of the image with transformed variants of the compressed blocks. In an example, the compressed block substitution module 632 may cause the processor 602 to precompute the transformed variants, for example, at the beginning of a print job. In an example, the image transformation module 630 may also rearrange the transformed variants.

The computer-readable medium 600 may include a print engine interface module 640. The print engine interface module 640 may cause the processor 602 to instruct a print engine to print the transformed image. In an example, the print engine interface module 640 may cause the processor 602 to output the transformed variants in a different order than normal as part of performing the affine transformation (e.g., outputting the transformed variants in a reverse order). The print engine interface module 640 may also, or instead, cause the processor 602 to receive compressed blocks and instead output the transformed variants. For example, the computer-readable medium 600 may not include the image transformation module 630, and the print engine interface module 640 may be responsible for performing the affine transformation. The transformed variants and order may be selected to cause the print engine to form the transformed image on the medium when the print engine interface module 640 causes the processor 602 to output the transformed variants to the print engine. Referring to FIG. 2, the printhead failure detection module 610, the image analysis module 612, the quality evaluation module 620, the print simulation module 622, the image transformation module 630, the compressed block substitution module 632, or the print engine interface module 640, when executed by the processor 602, may realize the controller 210, for example.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system, comprising:
a print engine to print a plurality of images on a medium, wherein each one of the plurality of images is printed on a respective ribbon of a plurality of ribbons on the medium, wherein each one of the plurality of ribbons comprises an elongated strip on the medium to receive a respective image that is repeated end-to-end along the elongated strip; and
a controller communicatively coupled with the print engine, the controller to:
detect a failure that results in a defect in a first image of the plurality of images in the respective ribbon of the first image while the print engine is printing the plurality of images,
perform an affine transformation on a second image in the respective ribbon of the first image in response to the failure that is detected to produce a transformed second image, wherein the controller is to perform the affine transformation of the second image by performing a 180-degree rotation of the second image that is repeated for each second image that is printed within the respective ribbon, and
instruct the print engine to print the transformed second image in the respective ribbon of the first image.

2. The system of claim 1, further comprising:
an image sensor to capture an image of the first image that is printed, wherein the controller is to detect the failure by comparing the image that is captured to print data.

3. The system of claim 1, wherein the print engine includes a plurality of stationary printheads to print the first image.

4. The system of claim 1, wherein the controller is to perform the 180-degree rotation on a compressed representation of the second image by:
substituting compressed blocks in the compressed representation with compressed blocks corresponding to rotational variants of the compressed blocks in the compressed representation; and
rearranging the rotational variants.

5. The system of claim 4, wherein the controller is to determine the rotational variants of the compressed blocks in the compressed representation by accessing a lookup table.

6. A method, comprising:
printing a plurality of images on a medium, wherein each one of the plurality of images is printed on a respective ribbon of a plurality of ribbons on the medium, wherein each one of the plurality of ribbons comprises an elongated strip on the medium to receive a respective image that is repeated end-to-end along the elongated strip;
detecting a defect in a printed copy of an image of the plurality of images in the respective ribbon of the image while the print engine is printing the plurality of images; and
printing a transformed version of the image based on the defect that is detected in response to the defect that is detected, wherein the transformed version of the image comprises a 180-degree rotation of the image that is repeated for each transformed version of the image that is printed in the respective ribbon of the image.

7. The method of claim 6, wherein printing the transformed version of the image comprises printing a rotated version of the image on the respective ribbon and an unrotated version of another image on another ribbon of the plurality of ribbons.

8. The method of claim 7, further comprising indicating that the one of the plurality of ribbons includes the rotated version of the image, and indicating a start position of the rotated version of the image.

9. The method of claim 6, wherein detecting the defect includes identifying a printhead that failed and identifying the respective ribbon associated with the printhead that failed.

10. The method of claim 9, further comprising:
determining a location in the transformed version of the image to be aligned with the printhead that failed; and
determining an amount of print content associated with the printhead that failed in the location, wherein printing the transformed version of the image comprises printing the transformed version of the image based on the amount of print content associated with the printhead that failed being less than a threshold.

11. A non-transitory computer-readable medium comprising instructions that, when executed by a processor, cause the processor to:
detect a failure of a printhead based on a defect in a printed copy of an image in a respective ribbon of the image of a plurality of ribbons, while printing a plurality of images on a medium, wherein each one of the plurality of ribbons comprises an elongated strip on the medium to receive a respective image of a plurality of images that is repeated end-to-end along the elongated strip;
in response to the failure detection, determine whether a print quality can be improved by performing an affine transformation on an image to be printed in a respective ribbon of a plurality of ribbons of a medium; and
perform the affine transformation on the image based on a determination that the print quality can be improved, wherein the affine transformation of the image comprises a 180-degree rotation of the image that is repeated for each affine transformation of the image that is to be printed in the respective ribbon of the image.

12. The computer-readable medium of claim 11, wherein the instructions, when executed by the processor, cause the processor to analyze a captured image of a printed product to identify the printhead with the failure.

13. The computer-readable medium of claim 11, wherein the instructions, when executed by the processor, cause the processor to simulate printing with the affine transformation performed to determine whether the print quality can be improved.

14. The computer-readable medium of claim 11, wherein the instructions, when executed by the processor, cause the processor to determine whether the print quality can be improved to within a predetermined threshold of the image without defects, and perform the affine transformation on the image based on a determination the print quality can be improved within the predetermined threshold.

15. The computer-readable medium of claim 11, wherein the instructions, when executed by the processor, cause the processor to perform the affine transformation by substituting compressed blocks in a compressed representation of the image for rotational variants and output the rotational variants in a reverse order.

* * * * *